United States Patent [19]
Peck

[11] 3,803,688
[45] Apr. 16, 1974

[54] METHOD OF MAKING A HEAT PIPE
[75] Inventor: Wayne P. Peck, St. Petersburg, Fla.
[73] Assignee: Electronic Communications, Inc., St. Petersburg, Fla.
[22] Filed: July 13, 1971
[21] Appl. No.: 162,084

[52] U.S. Cl. ............ 29/157.3 R, 29/423, 29/527.2, 29/DIG. 16, 29/DIG. 12, 165/105, 204/9
[51] Int. Cl. ........................ B21d 53/02, B23p 15/26
[58] Field of Search.... 29/157.3 R, 423, 460, 527.2, 29/DIG. 12, DIG. 16; 165/105; 204/9

[56] References Cited
UNITED STATES PATENTS

| | | | |
|---|---|---|---|
| 3,665,573 | 5/1972 | Werner et al. | 29/157.3 R X |
| 3,402,767 | 9/1968 | Bohdansky et al. | 165/105 |
| 3,668,080 | 6/1972 | Weber et al. | 29/423 X |
| 3,498,369 | 3/1970 | Levedahl | 29/157.3 R X |
| 3,305,005 | 2/1967 | Grover et al. | 165/105 |
| 3,681,843 | 8/1972 | Arcella et al. | 29/423 |
| 3,595,025 | 7/1971 | Stockel | 204/9 X |
| 3,692,637 | 9/1972 | Dederra et al. | 204/9 |

*Primary Examiner*—Charles W. Lanham
*Assistant Examiner*—D. C. Reiley, III
*Attorney, Agent, or Firm*—Sandoe, Hopgood & Calimafde

[57] ABSTRACT

A heat-transfer device or heat pipe having an integral screen-wick structure which provides relatively great contact area between the internal working fluid and the heat input. The screen wick is fabricated by a plurality of photographic etching and plating steps.

12 Claims, 14 Drawing Figures

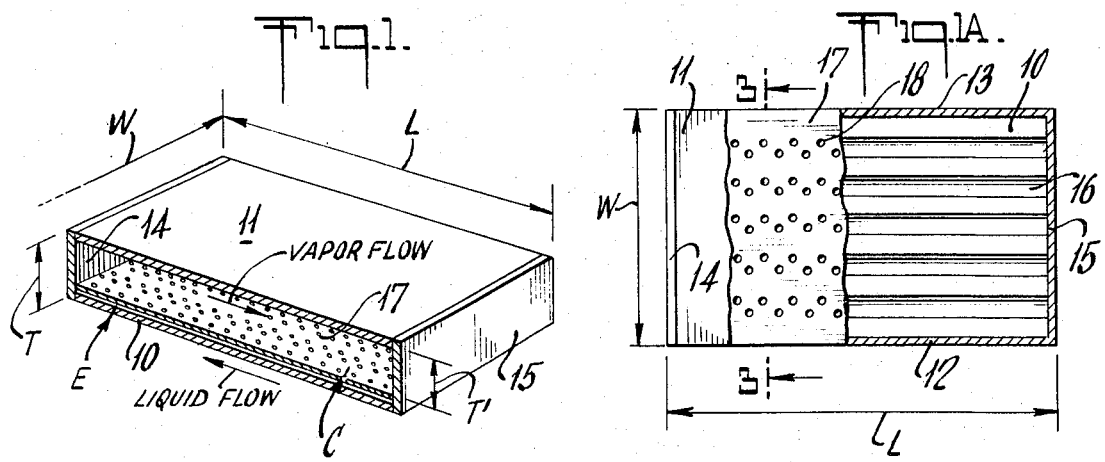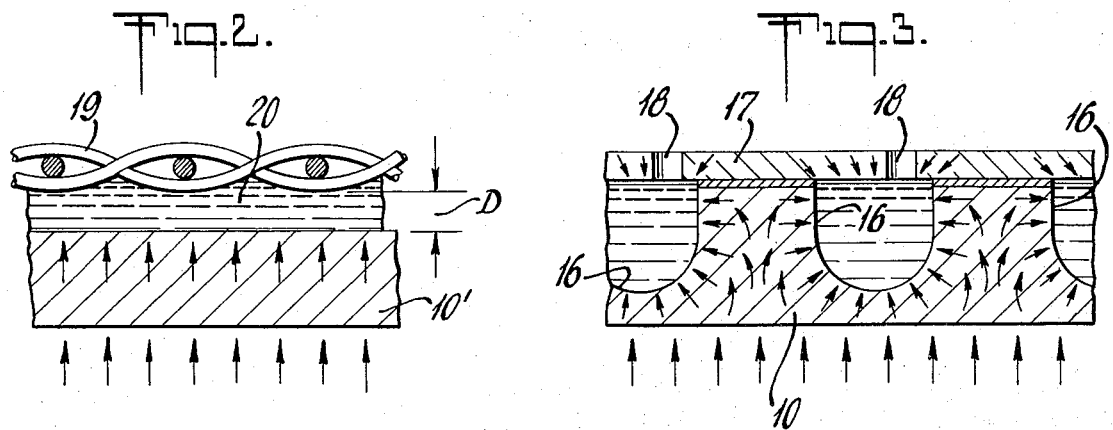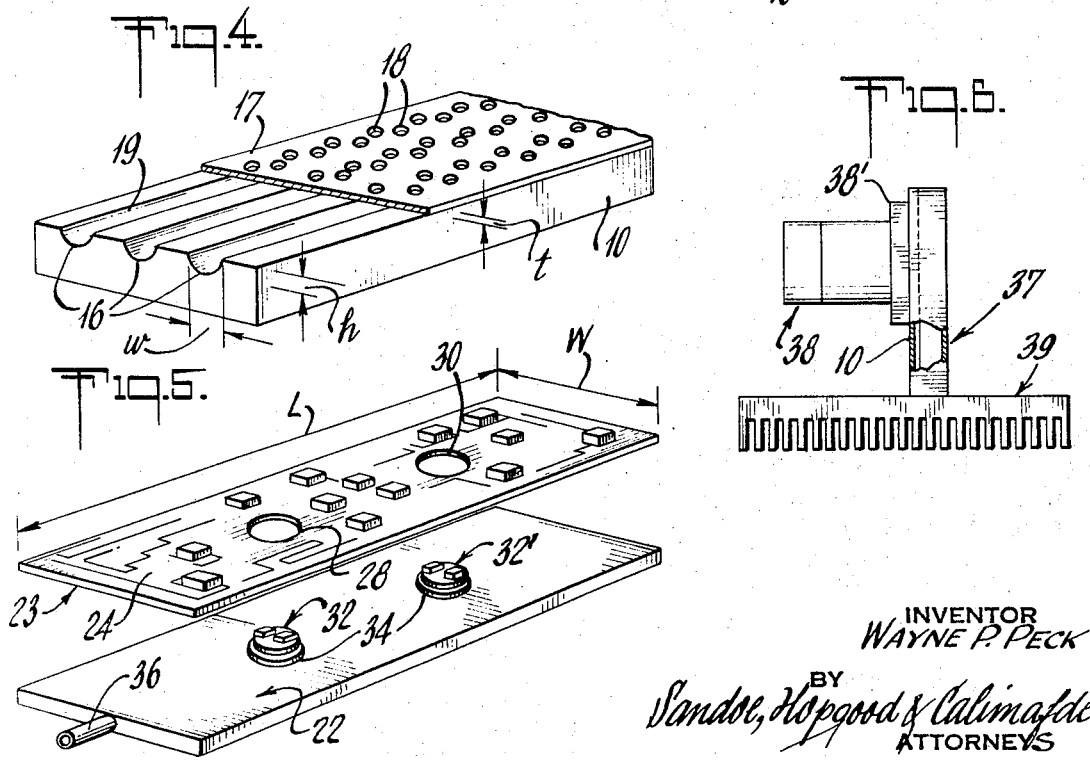

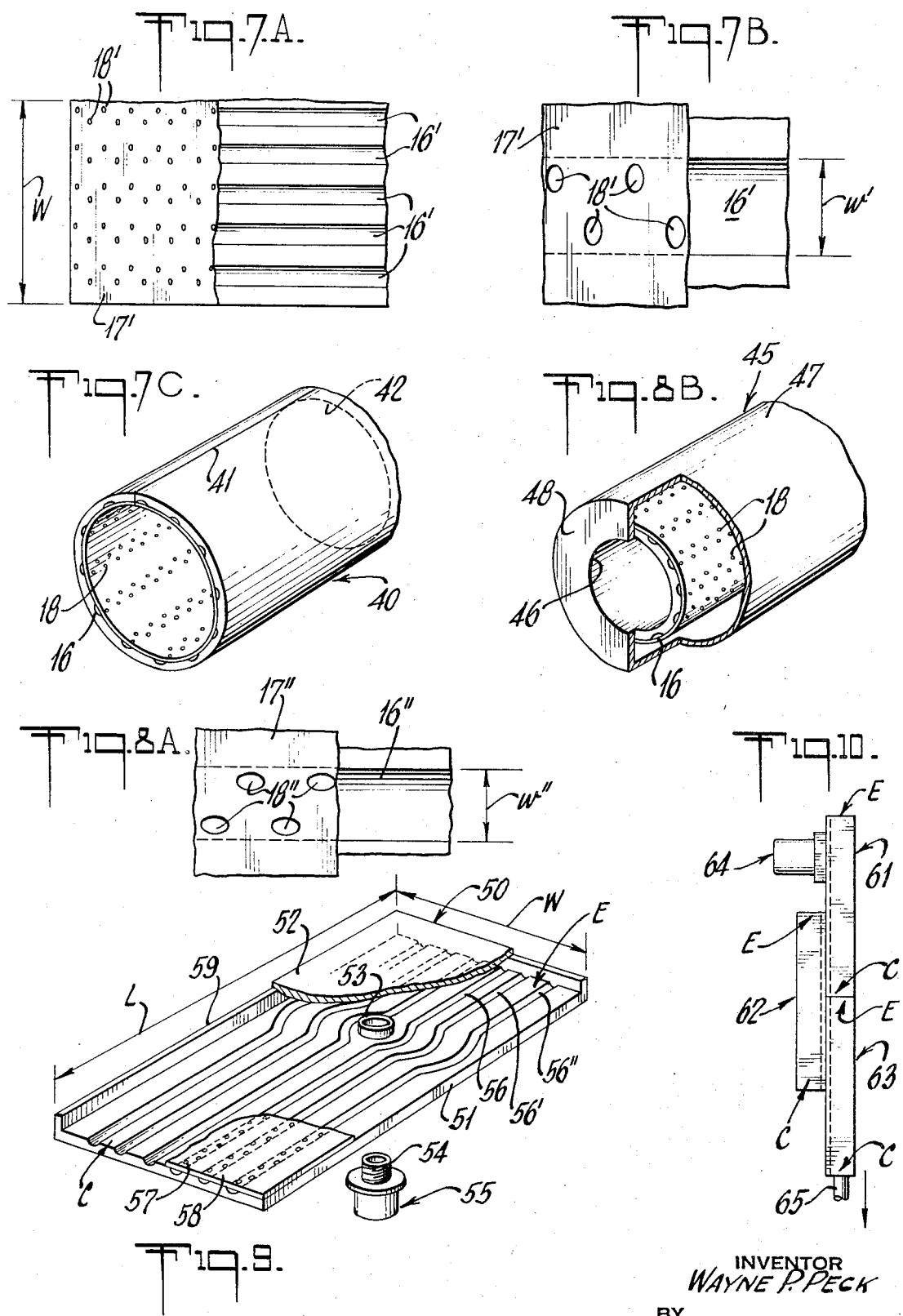

METHOD OF MAKING A HEAT PIPE

This invention relates to heat-transfer devices, such as heat pipes, and to a process for making a heat-transfer surface structure therefor. More particularly, the invention relates to heat pipes having integral screen wicks which are suitable for use in liquid-vapor phase systems.

Heat pipes are devices of high thermal conductance employing the principles of evaporation, vapor-heat transfer, condensation and capillary action. Vapor-heat transfer has long been known as an extremely efficient means of heat transfer and is usually employed in steam-heating plants.

Generally, in vapor-heat transfer, a transfer of heat energy occurs at the source through the evaporation of a given amount of liquid with the absorption of the heat of evaporation. The absorbed heat is then transported by the vapor to a heat sink with the deposition of the latent heat of a condensation. The heats of evaporation and condensation are equal. Thus, a large amount of heat is transported by a small amount of vapor. For example, if the working fluid is water, 1 gram will transport 2,260 joules; at a transfer rate of 1 gram per second, this corresponds to 2,260 watts.

However, the application of these principles (as utilized in steam-heating plants) to systems where smallness of size is of importance leaves much to be desired; steam-heating plants generally require large, complex cycling equipment which is difficult to adapt to systems where space is at a premium, as in electronic and aerospace applications. On the other hand, heat pipes which employ a combination of vaporization, condensation and wicking provide all of the advantages of vapor-heat transfer without the inclusion of elaborate, large, complex cycling equipment, since the basic heat pipe simply comprises a closed system having an evaporator area and a condenser area, separated by a duct, and a wick means located on the internal surface of the system which also contains a working fluid or condensable medium. In operation, the internal working fluid enters the duct, and the small temperature difference between the evaporator and condenser sections, along with the resulting difference in vapor pressure between the evaporator section and condenser section (which is greater than zero, i.e., $P_2 - P_1 > 0$) causes the vapor to be driven through the duct to the condenser; upon condensation, the condensate returns to the evaporator by way of the wick means. As mentioned, heat transfer is accomplished with very little temperature gradient. Consequently, the device is very nearly isothermal.

Even with such relatively efficient and simple devices, there still exists a need for making them still more compact while at the same time increasing the surface area of the working fluid that comes into contact with the heat input.

It is, therefore, an object of the invention to provide a heat pipe which, within given dimensional limitations, has an increased contact area between the working fluid and the heat input; more specifically, it is an object to achieve the foregoing in a flat structure having substantially decreased thickness requirements.

Another object is to provide an improved heat-pipe construction having inherently low liquid-flow resistance and capable of maintaining good capillary pumping pressure, while allowing efficient vapor escape of boiling liquid.

Another object is to provide, in a device of the character indicated, an improved wick construction and method of making the same.

It is also an object to provide such wick structure with smaller than conventional dimensions for a given thermal performance.

A further object is to provide improved wick structure of such capillary efficacy that it will enable heat-pipe construction of relatively large size and operative independent of wick orientation with respect to a gravity vector.

A further object is to provide such a method wherein dimensions in the ultimate wick can be accurately and reliably controlled, which method lends itself inherently to selective variation in order to maximize local physical properties, and which method lends itself to manufacture of flat wicks.

The present invention meets those and other objects by providing a heat-transfer device or heat pipe and a process for making the same, which has an integral screen-wick construction and wherein the heat input surrounds the internal working fluid and at the same time the height or thickness dimension can be held to a minimum (if desired) or increased as much as needed, without eliminating the increased contact-surface area between the internal working fluid and the heat input.

In order to understand the present invention more completely, reference is directed to the following description in conjunction with the accompanying drawings, wherein:

FIG. 1 is a simplified perspective view of a flat heat-transfer device or heat pipe of the invention, broken along a longitudinal section extending from end to end of the device;

FIG. 1A is a simplified plan view of the device of FIG. 1, partly broken away at the successive levels a—a and b—b of FIG. 1, to reveal internal structure;

FIG. 2 is an enlarged fragmentary sectional view of part of a flat heat pipe employing a conventional screen wick;

FIG. 3 is a view similar to FIG. 2, but taken at the line 3—3 of FIG. 1A and showing an integral-screen wick construction of the invention;

FIG. 4 is an enlarged perspective view, partly broken-away and in section, showing a partially completed heat-pipe base structure of the invention, and also illustrating certain process steps of the invention;

FIG. 5 is a simplified view in perspective showing, in exploded relation, a flat heat pipe of the invention in conjunction with a thin-film power-amplifier module;

FIG. 6 is a simplified view in elevation to show another applied context for a flat heat pipe of the invention;

FIGS. 7A, 7B and 7C illustrate a modification wherein the integral-wick feature of the invention is embodied in an elongated cylindrical heat pipe, FIG. 7A being a plan view of wick structure in a preliminary stage, FIG. 7B being an enlarged fragmentary view of the wick structure of FIG. 7A, and FIG. 7C being a perspective view of the completed pipe, cut at a radial plane to reveal internal detail;

FIGS. 8A and 8B are views similar to FIGS. 7B and 7C, respectively, to show a modification;

FIG. 9 is a simplified exploded view in perspective and partly broken away, showing a modified flat heat pipe; and FIG. 10 is a simplified view in elevation to show combined flat heat-pipe units.

Briefly stated, a heat-transfer device or heat pipe in accordance with the invention comprises a sealed metal container having an evaporator region and a condenser region in which the internal surface of the container is provided with a plurality of capillary grooves. Covering the internal surface of the container and extending over the grooves is an integral metallic plating containing a plurality of openings or holes forming an integral screen, and providing communication between the grooves and the interior of the container. The container encloses a condensable medium in an amount sufficient to enter the grooves upon condensation and to be transported by capillary action through the grooves from the condenser region to the evaporator region of the container. The grooved construction with the integral metallic plating or screen provides increased surface-contact area between the condensable medium in the grooves and heat input passing through the grooved structure. The process for manufacturing the grooved, metallic, heat-transfer surface structure (including the integral screen) generally comprises forming a plurality of grooves in the surface of the structure, which may be a metal sheet, filling the grooves with a filler, applying an integral metallic plating on the entire surface of the structure, forming openings or holes in the integral metallic plating over the grooves, and removing the filler from the grooves. The resulting grooved, integral screen structure is then used to form a container, being shaped where necessary to suit the particular construction desired.

In FIGS. 1 and 1A, a flat heat-pipe embodiment of the invention is seen to comprise a sealed metal container, having a bottom wall or base 10, an upper wall 11 spaced above the base 10, side walls 12–13, and end walls 14–15 The basic overall length, width and thickness dimensions are designated L, W, and T, respectively, the longitudinal dimension ranging from an evaporator region E near the end 14, to a condensing region C near the end 15. The integral wick-screen of the invention is embodied as an inner-surface characterization of the base wall 10; basically, such characterization comprises a series of laterally spaced grooves or capillary channels 16 running the longitudinal extent of the device and covered by an integral metal-screen layer 17 having plural openings 18 therein. In operation, heat input in the region E of end wall 14 causes liquid to evaporate or "boil" at E to develop sufficient locally elevated pressure to establish vapor flow in the direction indicated by legend; heat extraction in the region C of end wall 15 condenses the vapor at C, to replenish grooves 16 with liquid which, due to capillary action in grooves 16, is caused to flow (in the direction indicated by legend) back to the evaporator zone E, for recycling.

The detailed nature of the wick-screen structure of FIG. 1 can perhaps best be understood after brief description of a section of conventional structure, exemplified by FIG. 2. In FIG. 2, conventional construction is seen to include a metal base 10', which is the heat-input surface, a wire-screen wick 19 spaced a distance D slightly away from the base and fixed in any convenient manner to the internal surface of the side and end walls (not shown). A suitable working fluid or condensable medium 20, such as water partially fills the vessel. As may be seen, the heat input, designated by arrows, contacts only one surface of the working fluid in this type of construction, i.e., the wetted area of base 10' is the factor limiting base-to-liquid heat transfer.

In contrast to the conventional screen wick, FIG. 3 shows each groove 16 of the integral screenwick construction of the invention to contain the working fluid or condensable medium 20, each groove 16 forming one element of a capillary system. Each groove 16 is covered by the integral metal layer 17, having plural openings 18 in register with each groove, and forming a screen wick. The base 10 functions as the main heat-input surface, and in the diagram heat flow is suggested by heavy arrows. Solid metal almost completely surrounds liquid working fluid, so that the heat input is transferred directly to the liquid, including transfer via contact with the integral screen or layer 17. In a complete integral screen wick construction, a sufficient plurality of grooves 16 will afford a relatively great area of contact (per unit-volume of liquid, and per unit volume of the overall device) between the working fluid or condensable medium 14 and the heat input, all as suggested by arrows.

Depending upon the amount of heat which must be removed by a heat pipe having the integral-screen construction of this invention, there can be wide variation in the parameters of total overall size with respect to length, width, height or thickness, as well as in the number, depth, width and length of the grooves 16, thickness of the integral-screen metallic layer 17, the size and number of openings 18 therein, and the amount and nature of working fluid. Moreover, the most efficient geometric pattern for a given set of conditions is determinable by mathematical calculation and/or computerized thermal-simulation analysis. In general, however, in a heat pipe of the invention, the base which provides the main heat-input surface, would be as thin as possible, consistent with the thickness and strength needed to permit a maximum number of grooves of maximum depth, all to the end that there be maximum contact area of the working fluid with the heat input. Groove depth and width should not exceed size limitations for capillary action; and space between grooves 16 should not be so reduced as to choke the heat-input flow to layer 17. Furthermore, the parametric dimensions and proportions should be sufficient to provide an outside contact area large enough to receive and remotely transmit heat generated by a given source object to the extent necessary to maintain that object in the desired thermal condition, steady state or otherwise. The integral-screen surface 17 should be as thin as possible, with a maximum number of openings, in order to provide a vapor-venting function, as in a woven-screen structure.

The overall height or thickness of a heat pipe in accordance with the invention may vary. However, in keeping with the ideal situation of making the heat pipe as flat as possible and still of an operative geometric configuration in regard to height or thickness, the internal space T' (FIG. 1) above the integral-screen structure should be of sufficient height and volume to accommodate the vapor phase of the working fluid, without compromising action at the evaporator region E and at the condenser region C.

Any metal or metal alloy having good heat-conducting properties and preferably good malleability can be employed in making a heat pipe in accordance with the invention. Suitable metals include but are not limited to copper, brass, steel, and aluminum, and alloys thereof. Copper, however, is a preferred metal, since it has excellent malleability and good heat conductivity.

The working fluid or condensable medium can vary widely and may be a liquid or a gas under normal conditions. When a normal liquid medium is employed, it should be selected for its ability to vaporize and to condense under the conditions to which it is subjected in use. On the other hand, when the working fluid is normally a gas, it should be condensable under conditions of use and be susceptible to reconversion to its gaseous state form upon passage through the integral screen-wick structure by capillary action. Suitable materials which can be employed as the working medium include, but are not limited to, water, steam, air, and the like. The room-temperature pressure condition within the sealed structure will, of course, depend upon the design temperature range of the device, upon the liquid medium selected, as will be understood.

Heat-transfer surface structure of the invention and of the nature described above, may be manufactured by chemical etching in a predetermined pattern on a metallic structure or sheet; such technique is particularly suited to mass-production and at the same time exhibits a high degree of controllability and reliability. Thus, specifically, in accordance with a preferred method of the invention, a coating of pho-resist material is first applied to a metallic surface, and a groove pattern is exposed in the photo-resist material. The photo-resist material having the groove 16 pattern exposed therein is then developed, and a suitable etchant is applied to the surface (containing the developed pattern) to form grooves in the metallic surface. The grooves are filled with a filler, and a metallic plating base is applied at least on the filler, before plating a metallic layer over the entire surface. A coating of photo-resist material is next applied to the metallic layer, and a hole pattern is exposed in the photo-resist material; after developing the thus-exposed photo-resist material, a suitable etchant is applied to the developed surface to form holes in the metallic layer. Thereafter, the filler is dissolved and removed from the grooves 16, to leave an integral-screen structure as described.

In carrying out the process of the invention, any known photo-resist material known can be employed so long as it and the metallic material being etched are compatible with the particular etchant being used to achieve etching in the desired pattern. In this regard, known etchants such as ammonium persulfate, nitric acid, ammonium hydroxide, and ammonium carbonate combination, ferric chloride, and the like may be used in carrying out the process of the invention. Among these, ferric chloride is a particularly useful etchant when processing copper, a preferred metal useful in the practice of the invention.

Photo-resist materials which may be employed include KPR (Eastman-Kodak Co.), KMER (Eastman-Kodak Co.), PR (Dynachem Corp.), and the like.

For best results, the surface to be etched should be chemically cleaned before application of the photo-resist material. Any of the known chemical cleaning agents useful in preparing metal surfaces for further processing can be utilized. Among these are Keolite 235, Lectrite, NF, and Metex L-5 (Mac Dermid Inc.), the latter being particularly useful with copper.

The photo-resist coating can be applied in any convenient manner, as by brushing, painting, dipping, and the like. However, such care should be taken in applying the coating that a uniform film of photo-resist material is obtained on the metal surface.

The pattern for the grooves 16, as well as for the openings or holes 18 in the metallic layer which forms the screen, may be generated in a known manner on an enlarged scale, with the aid of a computer and an automatic plotter, after which the generated patterns may be photographically reduced to appropriate size for a given heat-pipe design and used as film-pattern masters in the etching process, being exposed in the photo-resist material applied to the metal base and developed in the known manner. Etching then takes place by subjecting the surface of the developed photo-resist material to a suitable etchant for a period of time sufficient to achieve the desired groove width and depth. When etching is completed, any remaining photo-resist material is removed in a convenient manner, as by physically stripping or washing the grooved surface with a solvent for the photo-resist material.

The grooves are then filled preferably with a suitable plastic filler such as Rigidax Type-W1 (M. Argueso & Co. Inc.), polystyrene, and the like, although readily soluble non-plastics may also be used, as for example, paraffin, cero alloys, and the like. The filler is then machined to make it flush with the metal surface. It is generally recommended that, after machining, the entire surface be cleaned again with Metex L-5 (Mac Dermid Inc.) or other suitable cleaner. This is especially so when using a plastic filler such as Rigidax (M. Argueso & Co. Inc.), in order to be sure that no oil is left. The surface is now ready for the plating step, which may or may not include the application of a metallic plating base to the filler. In cases in which the filler is compatible with the metallic layer to be next applied, electroplating of the metallic layer is then accomplished by known procedures for a period of time sufficient to deposit a metallic layer of the desired thickness over the entire grooved surface of the structure being processed. On the other hand, should the filler be incompatible with the metallic layer, a metallic plating base is applied on the filler by any known electroless-plating process; for example, in the event of using Rigidax (M. Argueso & Co. Inc.) as a plastic filler, chemical deposition from a suitable electroless-plating bath of copper sulfate and formaldehyde is performed for period of time sufficient to achieve a continuous, thin coating of the metallic plating base on the surface of the filler.

It is to be noted that the metallic plating base may be one which is or is not compatible with the metal surface of the base structure. So long as the base structure and the metallic material to be electroplated thereon are compatible with each other, the metallic plating base need only be compatible with the filler and the electroplated metal. On the other hand, where such is not the case, a metallic plating base (compatible with the layer to be electroplated, the filler, and the metal of the base structure) can be used to cover the entire surface by electroless plating.

After electroplating the metallic layer which is to form the screen, the openings or holes 18 are formed in the screen layer 17, after performing the recommended cleaning step; thus, openings 18 are formed by the indicated photo-resist coating procedure, exposing a hole pattern in the photo-resist material, and carrying out the development and etching steps on the electroplated metallic layer.

Subsequent to the hole-forming etching step, the filler is removed by dissolving it in the suitable solvent. The dissolution may be carried out by immersing the entire structure in a solvent bath until dissolution is complete. Suitable solvents which are compatible with fillers such as Rigidax, paraffin, and polystyrene are trichlor ethylene, toluol, and xylene.

Finally, to enhance wetting of the surface of the resulting wick structure and to improve capillary flow in grooves 16, the product is preferably cleaned by contacting with Metex L-5 and by chemical contacting with materials such as 10 percent mixture of sodium polysulfide in water, or a solution of 1 pound copper carbonate in 1 quart of ammonium and 2½ quarts of water, or by anodizing, and the like.

A specific example of copper-base structure of the character indicated is illustrated in partially completed state in FIG. 4. A base 10, 3 inches long, 1-inch wide and 0.125-inch thick, and provided with three parallel grooves 16, is shown filled with undissolved plastic filler 21, running lengthwise therein. The groove width $w$ was 0.020 inch and the height $h$ was 0.015 inch. The screen 17 thickness $t$ was 0.005 inch. Over each groove 16, openings 19 were of 0.010-inch diameter, and at about 0.015-inch spacing, in staggered relation, as shown.

An excellent flat copper heat-transfer device 3 inches × 1 inch × 13 inches was made using the above-described base, as the lower walls 10, otherwise closed by remaining walls 11 to 15, and employing water as the working fluid; the device 22, FIG. 5 may be used to extract heat from a thin-film 25-watt UHF power-amplifier module 23. Passive thin-film circuitry 24 of the module 23 was arranged on an alumina substrate 26 having suitable openings 28 or 30 for the reception of transistor chips 32-32', seated in beryllia studs or on platforms 34 fixed, as by brazing, to an outer wall of the heat pipe 22; the wall 10 having the integral screen-wick of the invention will be understood to be the wall adjacent platforms 34 and substrate 26, and a cylindrical heat-pipe lead or conduit 36 served to connect the flat heat pipe 22 to a remote heat sink (not shown).

Heat-transfer device incorporating the integral-wick structure of the invention and the process for manufacturing the wick structure both present many advantages. For example, flat heat pipes (as thus far described) can be made more compact, thereby requiring less space. The integral metallic screen results in superior thermal and liquid transfer properties. The etched grooves provide open-flow channels with low resistance to longitudinal flow within the wick. The groove walls provide the rugged and precise screen support necessary for sustained capillary pumping pressure, and thus assuring recycled flow of condensed material to the evaporator region of the device. The process allows the construction of continuous, unobstructed flow channels which are encased in metal, allowing heat to be transferred through the walls of the channels rather than through the relatively non-conductive liquid, thus achieving greater heat flow per unit area. Furthermore, the process allows accurate control of the screen openings and their distribution, with enhanced efficiency of vapor condensing.

It is to be understood that many variations of the embodiments of this invention may be made without departing from the spirit and scope thereof. For example, in FIG. 6, a single flat heat pipe 37 is used to extract heat from a high-power electronic device 38 (at its base connection 38' to the evaporator end of pipe 37) and to dissipate the heat via a suitably finned member 39 by which sufficient cooling can be applied at the condensation end of pipe 37 to assure heat-pipe recycling. Also, for example, FIGS. 7A, B, C illustrate application to one cylindrical embodiment, and another is shown in FIGS. 8A and B.

The cylindrical heat pipe 40 of FIG. 7C will be understood to be essentially a flat integral base and wick (FIG. 7A) rolled into a cylinder, seamed at 41 along its length, and sealed by circular end plates, as suggested at 42. The base and wick may be as already described, using metal of sufficient ductility, such as copper. As shown, the width dimension W of the base and wick of FIG. 7A is transverse to the alignment of the grooves 16' therein. In the enlarged fragmentary detail of FIG. 7B, the groove width $w'$ is deliberately oversize, to the extent that upon rolling into cylindrical form, the grooves 16 (FIG. 7C) are of width desired for capillary action. In similar fashion, the individual openings 18' formed in the flat base and wick component (FIGS. 7A and 7B) are elliptical, being elongated in the sense of the width direction W (as shown), to enable their compression into ultimately circular openings 18 in the inner wall of the cylindrical wick structure of FIG. 7C.

In the embodiment of FIGS. 8A and 8B, the heat pipe 45 is annular and cylindrical, having an inner wall 46 with a radially outer surface that is characterized by the described integral screen-wick formations. An outer wall 47 and end walls, as at 48, complete the sealed annular enclosure of the heat pipe 45. Construction may be as described in FIGS. 7A, B, C, except that the rolling action, from the flat of FIG. 7A, to the cylinder 46, is the inside-out of that of FIG. 7C; it will be understood that in view of the screen-wick stretch necessary to produce the cylinder 46 (as distinguished from the compression to produce cylinder 40 in FIG. 7C), the width $w''$ of grooves 16'' is less than desired at 16 in FIG. 8B, and the elongation of openings 18'' prior to rolling to cylindrical form is in the longitudinal direction, as shown in FIG 8A, to assure circular openings 18 in the finished structure of FIG. 8B.

FIG. 9 illustrates application of the invention to a flat heat pipe 50 of rectangular planform dimensions L and W, and with an integral screen-wick base wall 51 and upper wall 52. Walls 51-52 have aligned openings (not shown) sealed by a bushing 53 which serves the dual purpose of maintaining the spaced relation of walls 51-52 and of permitting a through-passage by which the tail or stud 54 of an electronic heat source 55 (e.g., high-power semiconductor means) may be securely mounted in the E region of the heat pipe. FIG. 9 specifically shows that the capillary grooves 56-56'-56'' at progressive distances laterally of the bushing 53 may be formed to smoothly and continuously detour the bushing 53 while maintaining adequate groove spacing for efficient heat transfer to the liquid; it will be understood that the described photo-reduction, etching and plating technique lends itself particularly well to a correct and efficient lay-out of the grooves, assuring detours which are substantially centered on the axis of bushing 53, as shown, and assuring similar and registered placement of the corresponding courses of wick openings as at 57 in the plated layer 58. Side and end walls 59–60 complete the sealed structure, and a tubular heat pipe (not shown) may extract heat from the C end of the device, as at 36 in FIG. 5.

A particularly advantageous feature of my new heat pipe with integral screen wick is that capillary forces are so uniformly predictable and reliably achievable that heat-pipe action is largely independent of the local gravity vector, for an overall length dimension L hitherto unachievable, as for lengths of six inches. If greater lengths are needed, with relative independence of the gravity vector, the invention lends itself to cascaded employment of similar heat-pipe units, as illustrated in FIG. 10, wherein three like flat heat-pipe elements 61–62–63 are assembled in cascade, in a vertical orientation, to serve a heat source 64. The units 61–63 are shown equally overlapped by unit 62, and the integral base-wick wall of each unit (suggested by adjacent dashed lines 61'–62'–63') are in extensive heat-transfer contact over the regions of overlap. Thus, the E region of unit 61 boils in response to heat input (i.e., as it extracts heat) from source 64; the E region of unit 62 boils in response to heat input (i.e., as it extracts heat) from the source represented by the C end of unit 61; and the E region of unit 63 boils in response to heat input (i.e., as it extracts heat) from the source represented by the C end of unit 62. Finally, heat from the C end of unit 63 is suitably remotely transmitted by suitable means 65.

While the invention has been described for heat pipes wherein the evaporation and condensation regions are at spaced ends of the structure, it will be understood that this was a simplification in that one of these functions may occur at a central region, with the other function at both ends. For example, evaporation may be at a region centrally located along the length direction of the grooves of the integral screen wick, while condensation regions are established at opposite longitudinal end regions.

What is claimed is:

1. The method of manufacturing a metallic heat-transfer surface structure including an integral screen wherein capillary action is relied upon to assure liquid flow through grooves beneath an apertured metal covering of the grooves, which method comprises forming a plurality of grooves in the surface of said structure, said grooves being of such restricted sectional dimension as to assure capillary flow therethrough for a given condensable fluid selected for use therewith, filling said grooves with a temporary filler, applying an integral metallic plating on the entire surface of said structure, forming a plurality of spaced openings in the integral metallic plating over each of said grooves and removing said filler from said grooves.

2. The method as defined in claim 1, wherein the grooves are formed by chemical etching.

3. The method of claim 2, wherein base is photoresist coated and wherein the pattern of grooves is photographically applied to said coating, prior to development and etching.

4. The method as defined in claim 1, wherein the integral metallic plating is applied by electro-plating.

5. The method as defined in claim 1, wherein the openings are formed in the integral metallic plating by chemical etching.

6. The method as defined in claim 1, wherein the grooves are filled with a plastic filler.

7. The method as defined in claim 1, wherein a metallic plating base is applied by electroless plating at least to the filler before applying the integral metallic plating.

8. The method as defined in claim 1, wherein the filler is removed by dissolving it in a solvent therefor.

9. The method of claim 1, wherein said surface structure is of elongate generally rectangular planform with said grooves formed in the longitudinal direction, and the further step of rolling said structure into a cylinder in which the longitudinal direction of the grooves is substantially parallel to the axis of the cylinder.

10. The method of claim 9, in which the openings over said grooves are initially generally elliptical with longitudinally oriented major axes, and in which cylindrical rolling is in the sense to stretch said plating and therefore said openings in the direction of making them circular and on the convex side of the cylinder.

11. The method of claim 9, in which the openings over the grooves are initially generally elliptical with major axes extending transverse to the longitudinal direction of the grooves, and in which cylindrical rolling is in the sense to compress said plating and therefore said openings in the direction of making them circular and on the concave side of said cylinder.

12. The method of manufacturing a metallic heat-transfer surface structure including an integral screen, which method comprises selecting a metal base having a flat surface, forming a plurality of spaced elongate capillary grooves in said surface, filling said grooves with a temporary filler, thereby exposing said surface only at unfilled regions thereof, electroplating a metal layer onto the filled surface in integrally and intimately bonded relation with exposed regions of said surface, whereby the plated layer also extends continuously over the grooves, forming a plurality of spaced openings in the plated metal layer over each of said grooves, and removing the filler from said grooves.

* * * * *